(12) United States Patent
Enomoto (10) Patent No.: US 7,471,335 B2
(45) Date of Patent: Dec. 30, 2008

(54) IMAGING UNIT, CAMERA BODY AND CAMERA SYSTEM

(75) Inventor: Shigeo Enomoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 788 days.

(21) Appl. No.: 11/135,275

(22) Filed: May 24, 2005

(65) Prior Publication Data
US 2005/0264675 A1 Dec. 1, 2005

(30) Foreign Application Priority Data
May 25, 2004 (JP) ............................. 2004-155006

(51) Int. Cl.
*H04N 5/225* (2006.01)
*H04N 5/222* (2006.01)
(52) U.S. Cl. ................... 348/373; 348/333.07; 396/513
(58) Field of Classification Search ................. 348/373, 348/333.07
See application file for complete search history.

(56) References Cited

U.S. PATENT DOCUMENTS

| 5,130,813 | A | * | 7/1992 | Oie et al. | ....................... 386/77 |
| 5,561,458 | A | * | 10/1996 | Cronin et al. | .................. 348/64 |
| 6,256,063 | B1 | * | 7/2001 | Saito et al. | ............. 348/231.99 |
| 6,264,378 | B1 | * | 7/2001 | Katoh et al. | ................. 396/348 |
| 6,646,864 | B2 | * | 11/2003 | Richardson | ................. 361/681 |
| 6,850,283 | B1 | | 2/2005 | Tatamiya | |
| 2003/0038880 | A1 | * | 2/2003 | No | ........................... 348/207.1 |
| 2004/0131350 | A1 | * | 7/2004 | Wilson Wang | .............. 396/513 |

FOREIGN PATENT DOCUMENTS

| JP | 10-271376 | 10/1998 |
| JP | 11-55557 | 2/1999 |
| JP | 2001-078073 | 3/2001 |

OTHER PUBLICATIONS

English Language Abstract of JP 11-55557.
English Language Abstract of JP 2001-078073.
English Language Abstract of JP 10-271376.

* cited by examiner

*Primary Examiner*—Lin Ye
*Assistant Examiner*—Hung H Lam
(74) *Attorney, Agent, or Firm*—Greenblum & Bernstein, P.L.C.

(57) ABSTRACT

An imaging unit to be inserted into a camera body from a predetermined direction, thus to constitute a digital camera in combination with the camera body, is provided. The imaging unit is provided with an image pickup unit including an imaging device that obtains an object image, an imaging device driver that drives the imaging device, an image processor that processes an output signal of the imaging device; a casing for accommodating the image pickup unit, the imaging device driver and the image processor, and a lid attached to the casing so as to slide between a closed position where the lid covers a receiving surface of the image pickup unit, and an open position where the lid does not cover the receiving surface of the image pickup unit. In this structure, the lid is moved to the open position by a force exerted for inserting the imaging unit into the camera body.

15 Claims, 8 Drawing Sheets

IMAGING UNIT, CAMERA BODY AND CAMERA SYSTEM

INCORPORATION BY REFERENCE

This application claims priority of Japanese Patent Application No. 2004-155006, filed on May 25, 2004, the entire subject matter of the application is incorporated herein by reference thereto.

BACKGROUND OF THE INVENTION

The present invention relates to an imaging unit, a camera body and a camera system.

Digital cameras for recording still images in a form of digital data have become extremely popular. Most of the commercially available digital cameras include a lens unit, an imagining device and an image processor integrally fixed to a camera body.

Because of such a structure of the digital camera, if a user wishes to enjoy a technical progress newly achieved in any of the camera body, lens unit, imaging device or the image processor, for example an increase in lens zoom magnification, improvement in mechanical shutter speed or in user-friendliness, achievement of a higher resolution, innovation in image processing technique or lower power consumption, the user is compelled to purchase an entire product embodying the improvement. This imposes a heavy economic burden to the user.

Accordingly, it is economically beneficial to the user to provide a digital camera that has an imaging unit including the imaging device and the image processor, removably mounted to the camera body, since the user can enjoy a technical progress simply by repurchasing the imaging unit only, when the progress is associated with the imaging unit, or the camera body only when the progress is related to the camera body.

Japanese Patent Provisional Publication No. HEI 10-271376 (hereafter, referred to as a document 1) discloses a digital camera including an imaging unit (specifically a camera main unit in the cited document 1) and a camera body (specifically a lens unit in the cited document) removably combined, though a design concept of this digital camera may be different from the foregoing viewpoint to some extent. The imaging unit disclosed therein includes a lid that protects the imaging device from dust or foreign substance when detached from the camera body, and a lid opening/closing mechanism. When the imaging unit is attached to the camera body, a power source included in the camera body supplies a current that drives the lid opening/closing mechanism to open the lid (Ref. paragraph 0020 and FIGS. 2 and 5 of the cited document 1).

However, the lid opening/closing mechanism has a complicated structure including an electromagnet and a link mechanism, which makes the camera larger in dimensions and increases the manufacturing cost. Besides, such a complicated structure is prone to incur a malfunction or failure.

SUMMARY OF THE INVENTION

The present invention is advantageous in that it provides an imaging unit, a camera body and a camera system having a simple structure that can surely open and close a lid covering a receiving surface of the imaging unit, when attaching or detaching the imaging unit to or from the camera body.

According to an aspect of the invention, there is provided an imaging unit to be inserted into a camera body from a predetermined direction, thus to constitute a digital camera in combination with the camera body. The imaging unit is provided with an image pickup unit including an imaging device that obtains an object image, an imaging device driver that drives the imaging device, an image processor that processes an output signal of the imaging device; a casing for accommodating the image pickup unit, the imaging device driver and the image processor, and a lid attached to the casing so as to slide between a closed position where the lid covers a receiving surface of the image pickup unit, and an open position where the lid does not cover the receiving surface of the image pickup unit. In this structure, the lid is moved to the open position by a force exerted for inserting the imaging unit into the camera body.

The imaging unit thus configured allows protectively covering the receiving surface of the image pickup unit with the lid, when the imaging unit is removed from the camera body. Accordingly, the receiving surface of the image pickup unit can be securely protected from dust, foreign substances or scratches. The configuration also allows automatically opening and closing the lid that covers the receiving surface of the image pickup unit upon attaching and detaching the imaging unit to and from the camera body, as well as opening the lid with a force exerted for inserting the imaging unit into the camera body, which eliminates the need to provide a driving mechanism for the lid. Consequently, the configuration provides an extremely simple mechanism, associated with also the camera body, which can surely open and close the lid without fear of a malfunction, and which can be built at a low cost.

Optionally, the lid may be attached to the casing so as to move parallel to an insertion direction of the imaging unit into the camera body.

Still optionally, the camera body may include an engaging portion to be engaged with the lid, so that an advance of the lid is blocked while the imaging unit is inserted into the camera body, and the lid relatively moves with respect to the casing in an opposite direction to the insertion direction, thus to reach the open position.

Still optionally, the lid may be located in a forward region of the imaging unit along the insertion direction, when set at the closed position.

Still optionally, the imaging unit may include an urging member that urges the lid toward the closed position.

Still optionally, the imaging unit may include a connector for electrical connection with the camera body. In this case, the connector may be disposed at a front end portion of the imaging unit along an insertion direction of the imaging unit into the camera body.

In a particular case, the connected may be configured as a standard interface connector.

In a particular case, an outside dimension of the imaging unit may comply with a PC card standard.

Still optionally, the imaging unit may include a display device that can display an image captured by the imaging device. In this case, the display device may have a display screen oriented opposite to the receiving surface of the image pickup unit.

Still optionally, the image pickup unit and the display device may be positioned so as not to appear overlapping when viewed from a direction perpendicular to the receiving surface of the image pickup unit, but to appear at least partially overlapping when viewed from a direction parallel to the receiving surface.

Still optionally, the image pickup unit and the display device may be aligned in this order from a front end portion toward a rear portion, along an insertion direction of the imaging unit into the camera body.

Still optionally, the imaging unit may include an imaging device board on which the imaging device driver and the imaging device are mounted, and a main board on which a display device driver, that drives the display device, and the image processor are mounted. In this case, the imaging device board and the main board may be positioned so as to appear partially overlapping when viewed from a direction perpendicular to the receiving surface of the image pickup unit.

In a particular case, the imaging unit may include a non-volatile memory for storing image data of the object image obtained by the imaging device.

According to another aspect of the invention, there is provided a camera body, which is provided with a holding member that holds the imaging unit mentioned above.

The imaging unit thus configured allows protectively covering the receiving surface of the image pickup unit with the lid, when the imaging unit is removed from the camera body. Accordingly, the receiving surface of the image pickup unit can be securely protected from dust, foreign substances or scratches. The configuration also allows automatically opening and closing the lid that covers the receiving surface of the image pickup unit upon attaching and detaching the imaging unit to and from the camera body, as well as opening the lid with a force exerted for inserting the imaging unit into the camera body, which eliminates the need to provide a driving mechanism for the lid. Consequently, the configuration provides an extremely simple mechanism, associated with also the camera body, which can surely open and close the lid without fear of a malfunction, and which can be built at a low cost.

According to another aspect of the invention, there is provided a camera system, which is provided the imaging unit mentioned above, and a camera body having a holding member that holds the imaging unit.

The imaging unit thus configured allows protectively covering the receiving surface of the image pickup unit with the lid, when the imaging unit is removed from the camera body. Accordingly, the receiving surface of the image pickup unit can be securely protected from dust, foreign substances or scratches. The system also allows automatically opening and closing the lid that covers the receiving surface of the image pickup unit upon attaching and detaching the imaging unit to and from the camera body, as well as opening the lid with a force exerted for inserting the imaging unit into the camera body, which eliminates the need to provide a driving mechanism for the lid. Consequently, the system provides an extremely simple mechanism, associated with also the camera body, which can surely open and close the lid without fear of a malfunction, and which can be built at a low cost.

DETAILED DESCRIPTION OF THE EMBODIMENTS

The following are detailed descriptions on the imaging unit, camera body and camera system according to an embodiment of the present invention.

Figure 1:
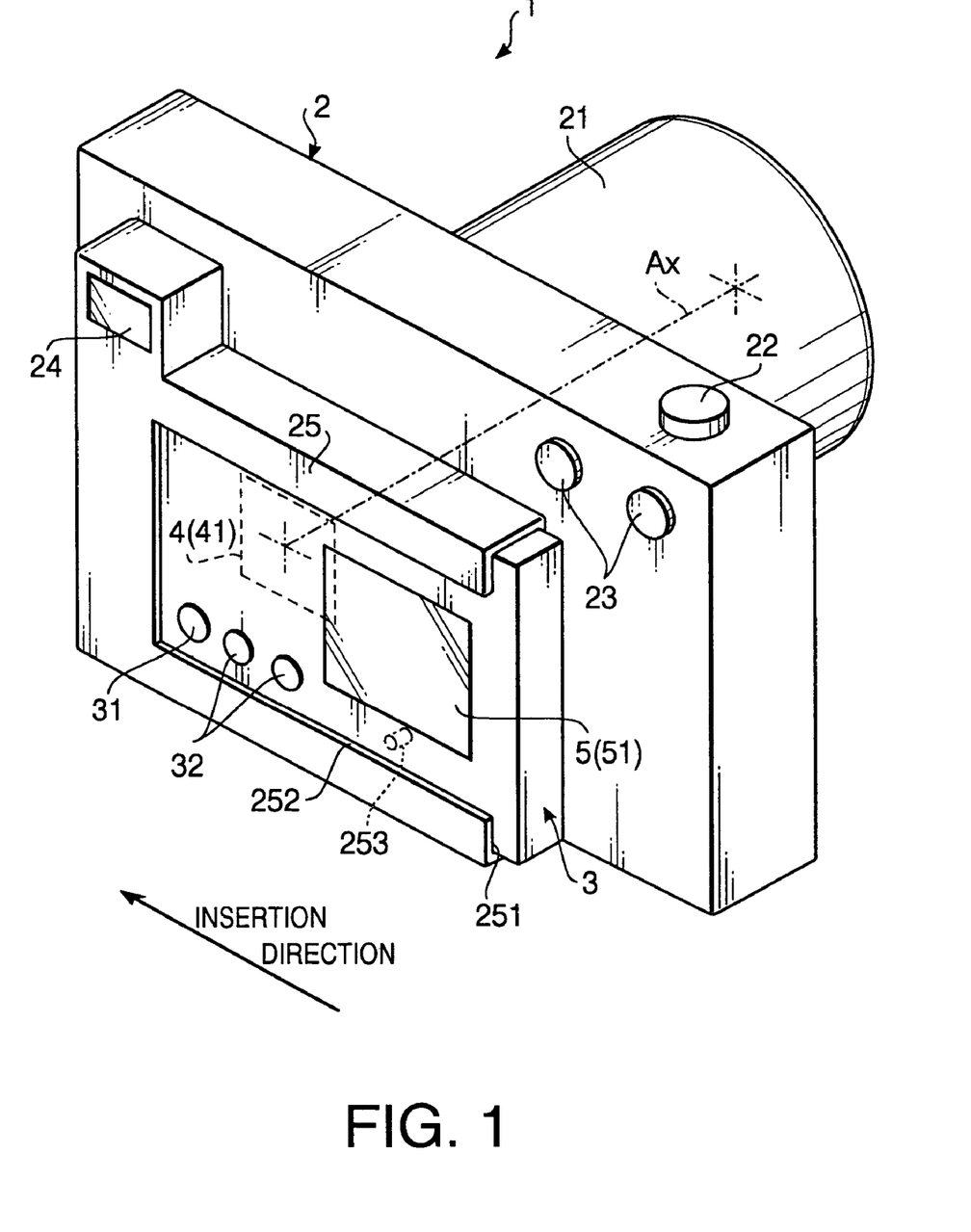
FIG. 1 is a perspective view from a backward direction, showing a camera system according to an embodiment of the present invention.

FIG. 1 is a perspective view from a backward direction, showing a camera system according to an embodiment of the invention. A camera system 1 shown in FIG. 1 includes a camera body 2 and an imaging unit 3, which are to be combined when used as a digital camera.

The camera body 2 is provided with a lens barrel 21 enclosing therein a camera lens, on its front face. The camera body 2 is also provided with an operational system including a shutter button 22 and zoom buttons 23, and an optical finder 24.

On the rear face of the camera body 2, a holding section 25 that holds the imaging unit 3 is provided. Upon inserting the imaging unit 3 through a slot 251 serving as an entrance of the holding section 25, the imaging unit 3 can be loaded on the camera body 2. As indicated by an arrow in FIG. 1, a direction in which the imaging unit 3 is inserted into the camera body 2 (hereinafter, simply "insertion direction") is orthogonal to an optical axis Ax of the camera lens. The imaging unit 3 loaded on the camera body 2 can be removed from the camera body 2 by drawing out the imaging unit 3 in a direction opposite to the insertion direction.

The imaging unit 3 includes an image pickup unit 4 having a CCD imaging device 41 that captures an image formed through the camera lens. The image pickup unit 4 is located such that a receiving surface thereof faces the front side, and that the center of the image pickup unit 4 coincides with the optical axis Ax of the camera body 2, when the imaging unit 3 is loaded. The imaging device may be of a different system such as a CMOS image sensor, instead of the CCD imaging device 41.

The imaging unit 3 is also provided with an LCD monitor (liquid crystal display device) 5 that performs a playback display of images captured or recorded by the CCD imaging device 41, or a live view display of real time moving images captured by the CCD imaging device 41. The display device of the imaging unit 3 may be of a different system such as an organic EL (electro luminescent) display device, instead of the LCD monitor 5. A display screen 51 of the LCD monitor 5 is oriented in a direction opposite to the receiving surface of the image pickup unit 4, i.e. toward the rear face.

The holding section 25 is provided with a cutaway portion 252 through which the rear face of the imaging unit 3 is exposed. When the imaging unit 3 is loaded on the camera body 2, the display screen 51 of the LCD monitor 5 can be visually observed through the cutaway portion 252. Instead of the cutaway portion 252, the entrance portion of the slot 251 may be left uncut, so as to define a window-shaped opening.

The imaging unit 3 is provided, on its rear face, with a monitor display switch 31 for turning on and off the LCD monitor 5, and an image feed button 32 for selecting an image to be displayed, both of which are also exposed through the cutaway portion 252.

Figure 2:
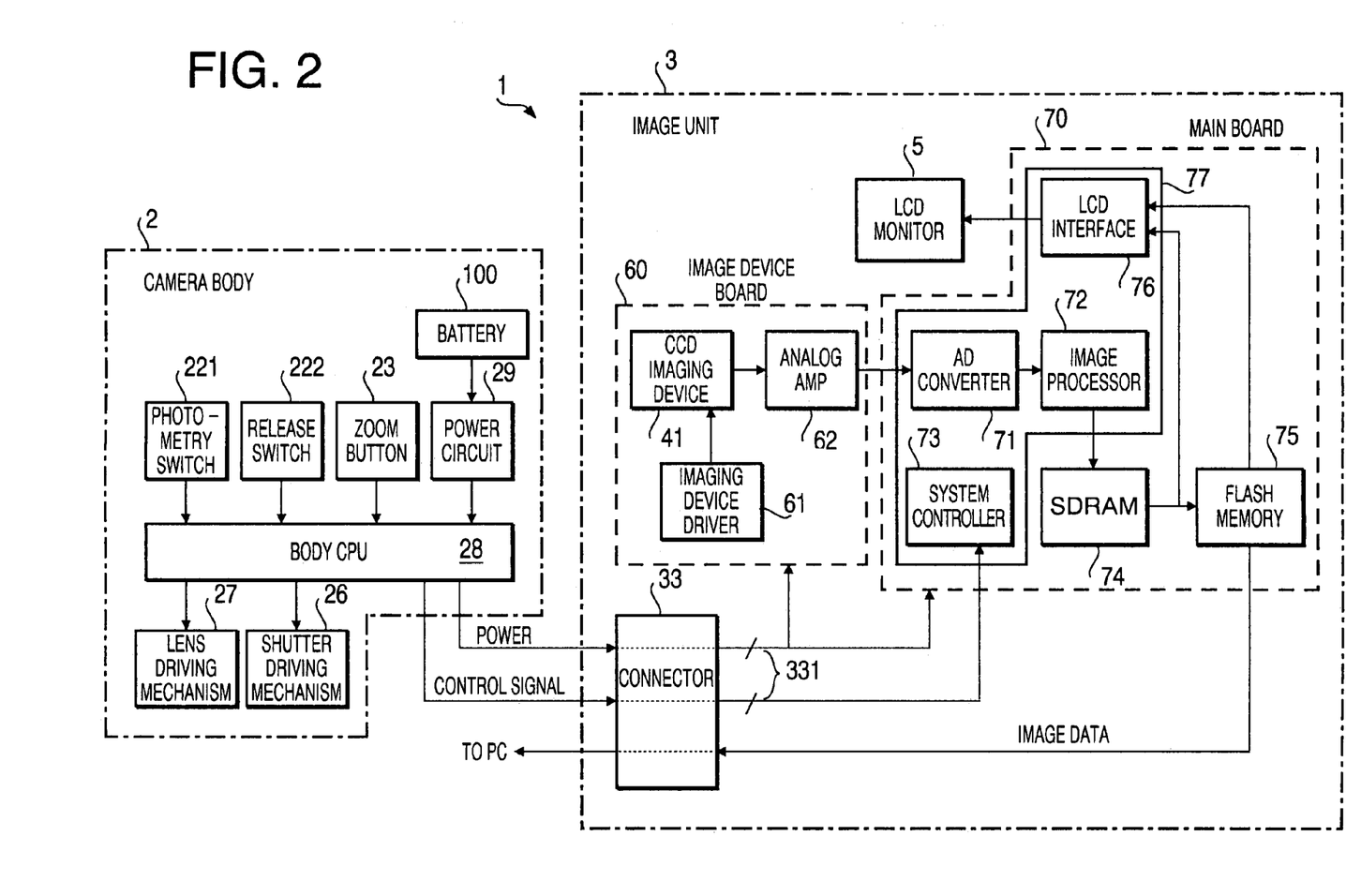
FIG. 2 is a block diagram showing a configuration of the camera system of FIG. 1.

FIG. 2 is a block diagram showing a configuration of the camera system of FIG. 1. Referring to FIG. 2, the internal structure of the camera body 2 and the imaging unit 3 will be described hereunder.

The camera body 2 includes a mechanical shutter (not shown), a shutter driving mechanism 26 that drives the mechanical shutter, a lens driving mechanism 27 that performs zooming and automatic focusing (AF) of the camera lens, and a body CPU 28. The CPU 28 controls the operation of the shutter driving mechanism 26, lens driving mechanism 27 and so on based on an input signal from the operational system including the shutter button 22 and the zoom button 23.

The camera body 2 can accommodate a battery 100, which supplies power to the respective components of the camera body 2 and the imaging unit 3, through a power circuit 29.

The imaging unit 3 includes an imaging device board 60 carrying the CCD imaging device 41, and a main board 70. On the imaging device board 60, an imaging device driver 61, and an analog amplifier 62 that amplifies an output signal from the CCD imaging device 41 are also located.

The main board 70 is provided with an A/D converter 71 that performs analog-digital conversion of an output signal from the CCD imaging device 41, an image processor 72 that executes an image processing such as a predetermined color processing or a gamma correction with respect to the digitized output signal from the CCD imaging device 41, a system controller 73 that controls the circuits on the main board 70 and the imaging device board 60, an SDRAM (Synchronous Dynamic Random Access Memory) 74 that temporarily stores a memory, for example when generating an image data, a flash memory 75, which is a non-volatile memory for storing shot image data for recording, and an LCD interface (display device driver) 76 that drives the LCD monitor 5.

Among those circuits referred to above, the A/D converter 71, the image processor 72, the system controller 73 and the LCD interface 76 constitute a DSP (Digital Signal Processor) 77 that integrally controls the processing operation, such as the image processing and image recording.

The imaging unit 3 also includes a connector 33 serving for electrical connection with the camera body 2. When the imaging unit 3 is loaded on the camera body 2, the connector 33 connects the imaging device board 60 and the main board 70 to the body CPU28 in the camera body 2, through a connector bus 331.

The system controller 73 and the body CPU28 are designed so as to cooperate in performing the control, based on mutual communication through the connector bus 331. For example, control signals from the shutter button 22 or the zoom button 23 are transmitted from the body CPU28 to the system controller 73, via the connector bus 331.

The connector bus 331 also serves to supply power to the imaging unit 3, from the camera body 2.

Now, operations related to a real time display, i.e. a live view display of an image captured by the CCD imaging device 41 on the LCD monitor 5, will be described.

An object image formed on the receiving surface of the CCD imaging device 41 through the camera lens in the lens barrel 21 is subjected to a photoelectric conversion to be transformed into charge data (signal), which is thinned out by a predetermined number of pixels and sequentially read out from the CCD imaging device 41 for generating the live view image data, to be input to the DSP 77 after being subjected to correlated double sampling (CDS) and automatic gain control (AGC).

At the DSP 77, the input signal is digitized through the A/D conversion and subjected to a predetermined color processing, gamma correction etc. By this process the live view image data (luminance signal data Y, two color difference signal data Cr, Cb) is generated, so that the live view image is displayed on the LCD monitor 5 based on such data. The live view image data is composed of a fewer number of pixels than the effective number of pixels of the CCD imaging device 41, because of the thinning out process in accordance with the displaying capacity of the LCD monitor 5.

The generation of the live view image data is periodically updated along with the progress of the reading out from the CCD imaging device 41, so that the image data is displayed in a form of a real time moving image on the LCD monitor 5.

Operations related to photoshooting and recording will now be described hereunder. Pressing the shutter button 22 halfway turns on a photometry switch 221, and the body CPU 28 transmits a signal to the system controller 73 instructing to start a photometry and exposure calculation. This signal serves as a trigger for activating the system controller 73 to execute the photometry and exposure calculation based on an output signal of the CCD imaging device 41. The system controller 73 then performs the AF control, and activates the lens driving mechanism 27 through the body CPU28, to thereby drive the lens for focusing.

Under such a state, pressing the shutter button 22 all the way down turns on a release switch 222, the body CPU28 activates the shutter driving mechanism 26 so as to operate the mechanical shutter based on an exposure time calculated by the system controller 73, and transmits signals related to the execution of the exposure, such as a mechanical shutter release signal and exposure (charge accumulation) time, to the imaging unit 3.

Upon receipt of such signals, the DSP 77 performs charge cleaning control for the CCD imaging device 41 and the exposure control (charge accumulation time control), and reads out the charge data from the CCD imaging device 41 through a similar process to the above but without thinning out the pixels, to temporarily store the charge data in the SDRAM 74. The DSP 77 then performs a predetermined processing with the charge data retrieved from the SDRAM 74, to thereby generate master still image data for recording, which has the full number of pixels.

The DSP77 thins out the pixels from the master still image data for recording just generated, thus to create a screen nail of the still image for displaying, in accordance with the pixel display capacity of the LCD monitor 5, and displays such data in the LCD monitor 5 for a predetermined time.

Further, the DSP 77 compresses the master still image data for recording, for example in a JPEG format, and records the compressed image data in the flash memory 75.

To view the shot image stored in the flush memory 75 on a personal computer (hereinafter, simply PC), the image data can be downloaded to the PC by removing the imaging unit 3 from the camera body 2 and connecting the imaging unit 3 to the PC via the connector 33. In this case, power for the imaging unit 3 is supplied by the PC.

Figure 3:
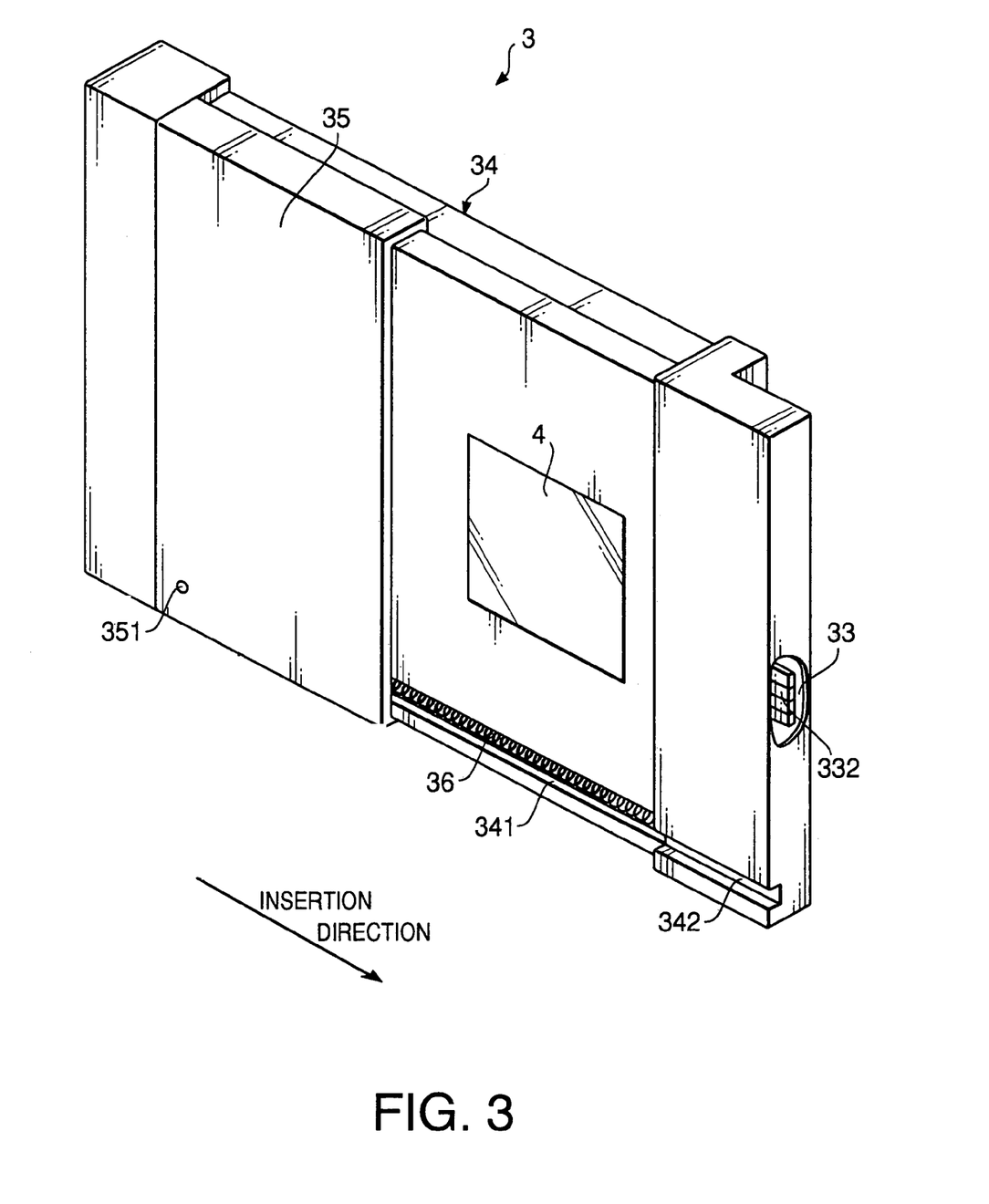
FIG. 3 is a perspective view from a forward direction, showing an imaging unit included in the camera system of FIG. 1.
Figure 4:
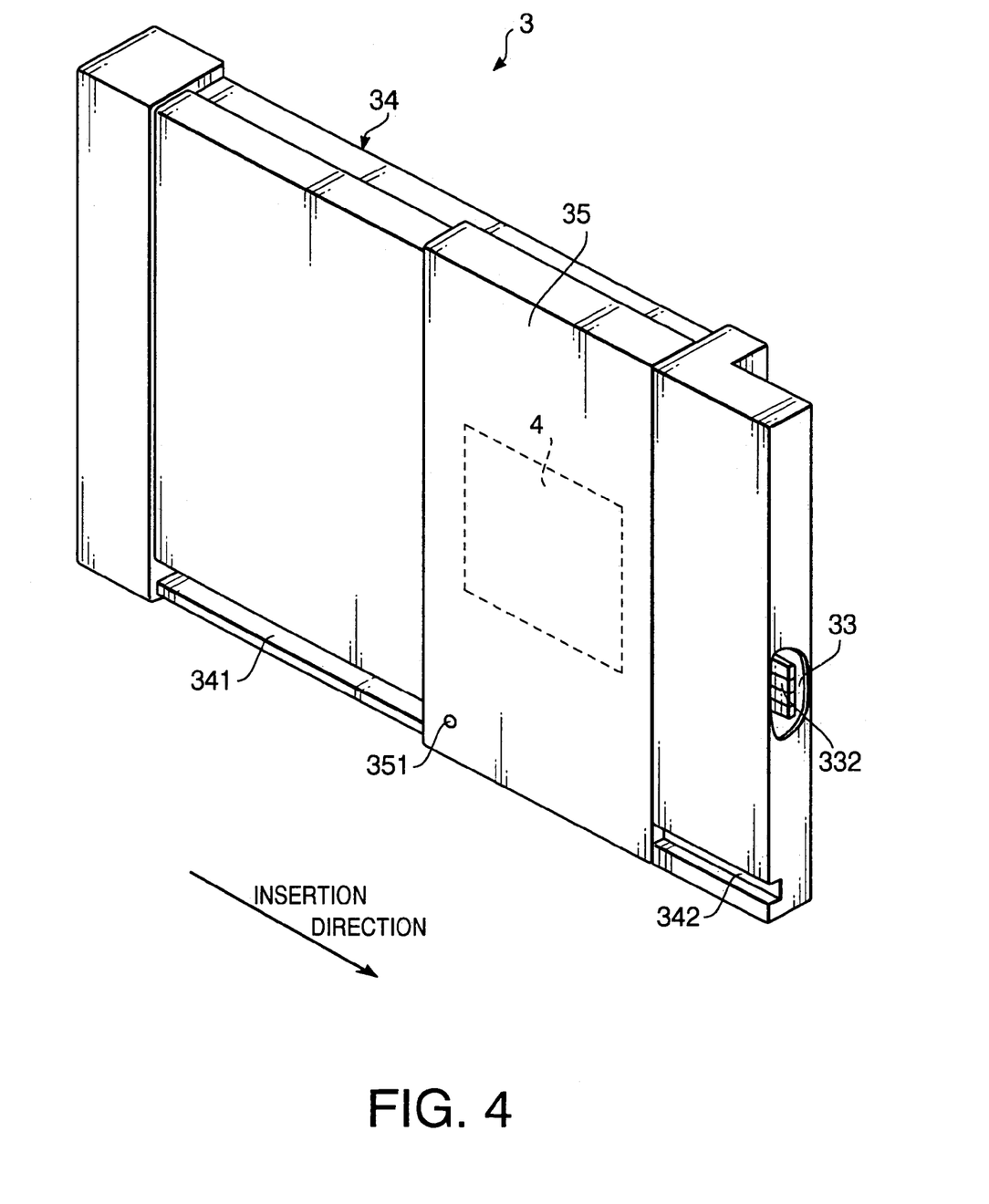
FIG. 4 is a perspective view from a forward direction, showing the imaging unit included in the camera system of FIG. 1.
Figure 5:
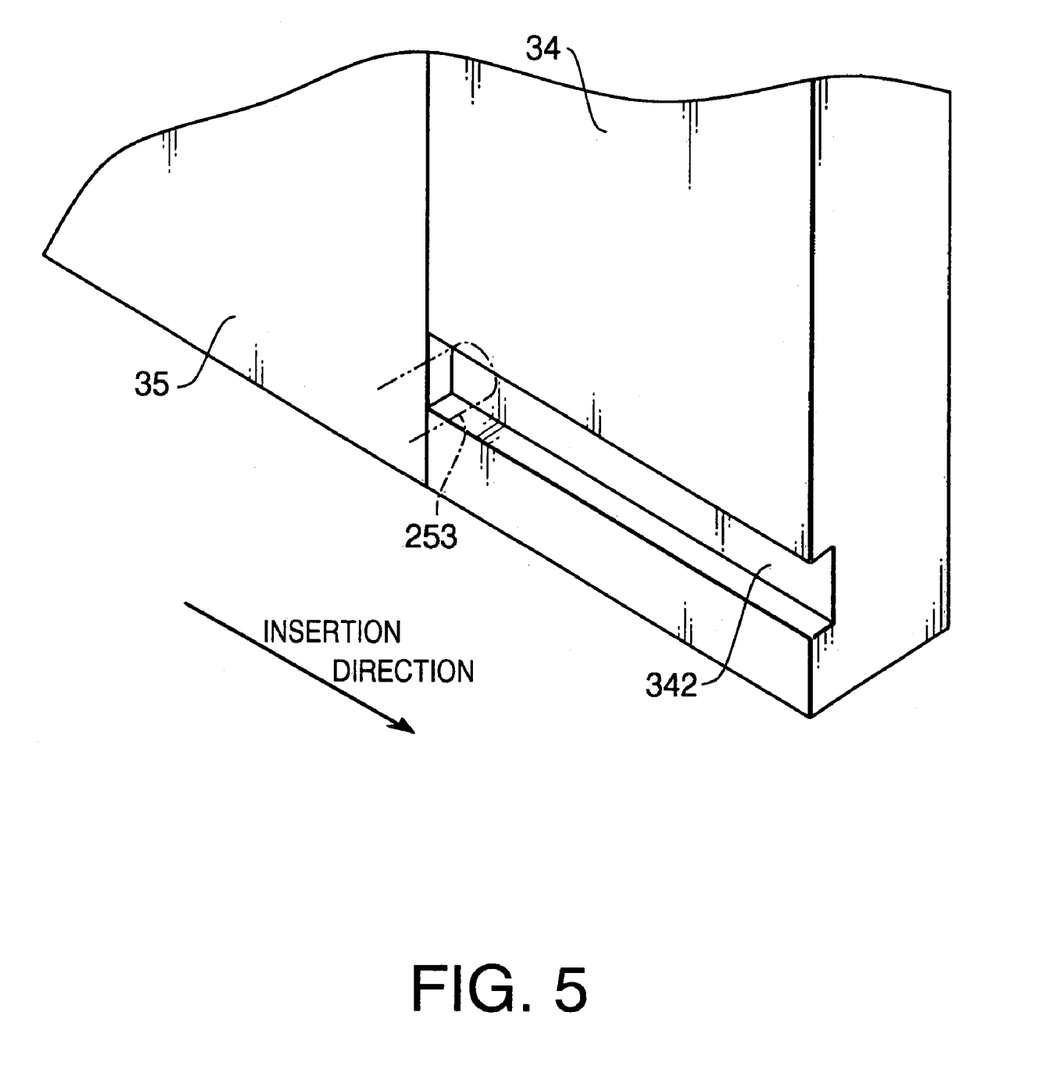
FIG. 5 is an enlarged fragmentary perspective view showing the imaging unit of FIG. 4.

FIGS. 3 and 4 are perspective views from a forward direction, showing the imaging unit 3, and FIG. 3 depicts a state where a lid 35 is opened while FIG. 4 depicts a state where the lid 35 is closed. FIG. 5 is an enlarged view of a part of FIG. 4.

Referring to FIG. 3, the imaging unit 3 includes a plate-shaped casing 34, in which the image pickup unit 4 including the CCD imaging device 41, the imaging device board 60 and the main board 70 are accommodated. The casing 34 is provided with an opening at a position corresponding to the receiving surface of the image pickup unit 4, such that the receiving surface of the image pickup unit 4 is exposed on the front face of the casing 34, via the opening.

At the front end portion of the casing 34 along the insertion direction, the connector 33 is located. Electrical contacts (not shown) are provided at an innermost position of the holding section 25 of the camera body 2, so that when the imaging unit 3 is inserted into the holding section 25 of the camera body 2 the electrical are electrically connected to a terminal 332 of the connector 33.

In this embodiment, the connector 33 complies with the standard of the USB (Universal Serial Bus). Adopting a standard interface connector such as the USB for the connector 33 allows easy connection of the imaging unit 3 to the PC. Since the connector 33 of the imaging unit 3 configured as an USB connector, the imaging unit 3 can be connected to a personal computer having an USB interface. Therefore, by connecting the imaging unit 3 to the personal computer, image data recorded in the imaging unit 3 can be copied from the imaging unit 3 to the personal computer.

The imaging unit 3 further includes a lid (sliding door) 35, slidably disposed with respect to the casing 34. The lid 35 can be moved between a closed position (as FIG. 4) where the lid 35 covers the receiving surface of the image pickup unit 4, and an open position (as FIG. 3) that leaves the receiving surface of the image pickup unit 4 exposed. The moving direction of the lid 35 is parallel to the insertion direction of the imaging unit 3 into the camera body 2.

The lid 35 is constantly urged toward the closed position by a coil spring 36, serving as an urging member. The left end of the coil spring 36 in FIG. 3 is fixed to a fixing pin 351 projecting from an inner face of the lid 35, while the right end of the coil spring 36 in FIG. 3 is fixed to the casing 34. The coil spring 36 is accommodated in a groove 341 provided on the casing 34.

Referring to FIG. 4, when the imaging unit 3 is not loaded on the camera body 2, the lid 35 is set at the closed position by the coil spring 36, and hence the receiving surface of the image pickup unit 4 is covered. This prevents adherence of dust or foreign substances to the receiving surface of the image pickup unit 4, and damage by an impact of any object, thus protecting the receiving surface of the image pickup unit 4.

When it is necessary to clean the receiving surface of the image pickup unit 4, for example with a blower, the lid 35 can be easily opened against the urging force of the coil spring 36.

The lid 35 is designed to automatically open when the imaging unit 3 is inserted into the holding section 25 of the camera body 2, because of the force being exerted for the insertion.

Referring back to FIG. 1, the holding section 25 of the camera body 2 includes a projecting stopper pin (engaging portion) 253 to be engaged with the lid 35. Also as shown in FIG. 4, the casing 34 is provided with a groove 342 at its front end portion, in which the stopper pin 253 can fit.

When inserting the imaging unit 3 into the holding section 25 of the camera body 2, the stopper pin 253 starts to relatively move in the groove 342 at an initial stage of the insertion, until the stopper pin 253 contacts an edge of the lid 35 (Ref. FIG. 5). As the imaging unit 3 is inserted deeper into the holding section 25 of the camera body 2 from the state shown in FIG. 5, the stopper pin 253 becomes engaged with the lid 35, thus to prevent the lid 35 from proceeding further in the insertion direction. In other words, the lid 35 relatively moves in a direction opposite to the insertion direction with respect to the casing 34, thus sliding toward the open position shown in FIG. 3.

When the lid 35 reaches the open position, the coil spring 36 is expanded and thereby stores energy. Such energy serves to shrink the coil spring 36 upon removal of the imaging unit 3 from the camera body 2, so as to automatically close the lid 35.

In this way, the lid 35 can be automatically opened and closed with the insertion and removal of the imaging unit 3 into and from the camera body 2. Besides, the force exerted for inserting the imaging unit 3 into the camera body 2 is directly utilized to open and close the lid 35, which eliminates the need to provide a driving mechanism for the lid 35. Consequently, an extremely simple mechanism that also involves the camera body 2 is provided, which can surely open and close the lid without fear of a malfunction, and which can be built at a low cost.

Also, according to this embodiment the lid 35 is located in a forward region of the imaging unit 3 along the insertion direction when closed, as shown in FIG. 4. Such a structure allows the lid 35 to start moving at an initial stage of the insertion of the imaging unit 3 into the holding section 25, and thus ensures that a sufficiently large space is created when the lid 35 is opened.

Figure 6:
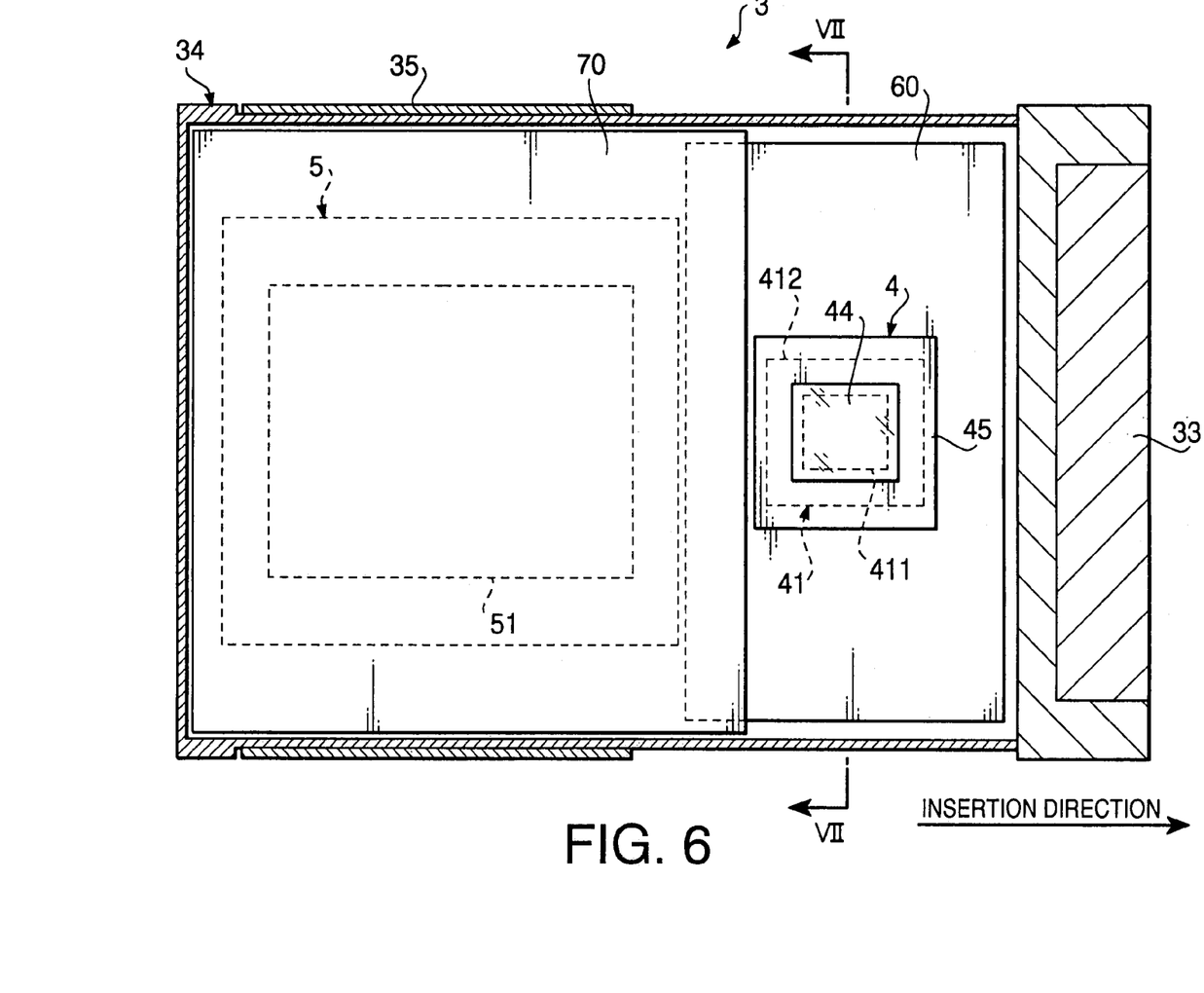
FIG. 6 is a cross-sectional front view showing the imaging unit included in the camera system of FIG. 1.
Figure 7:
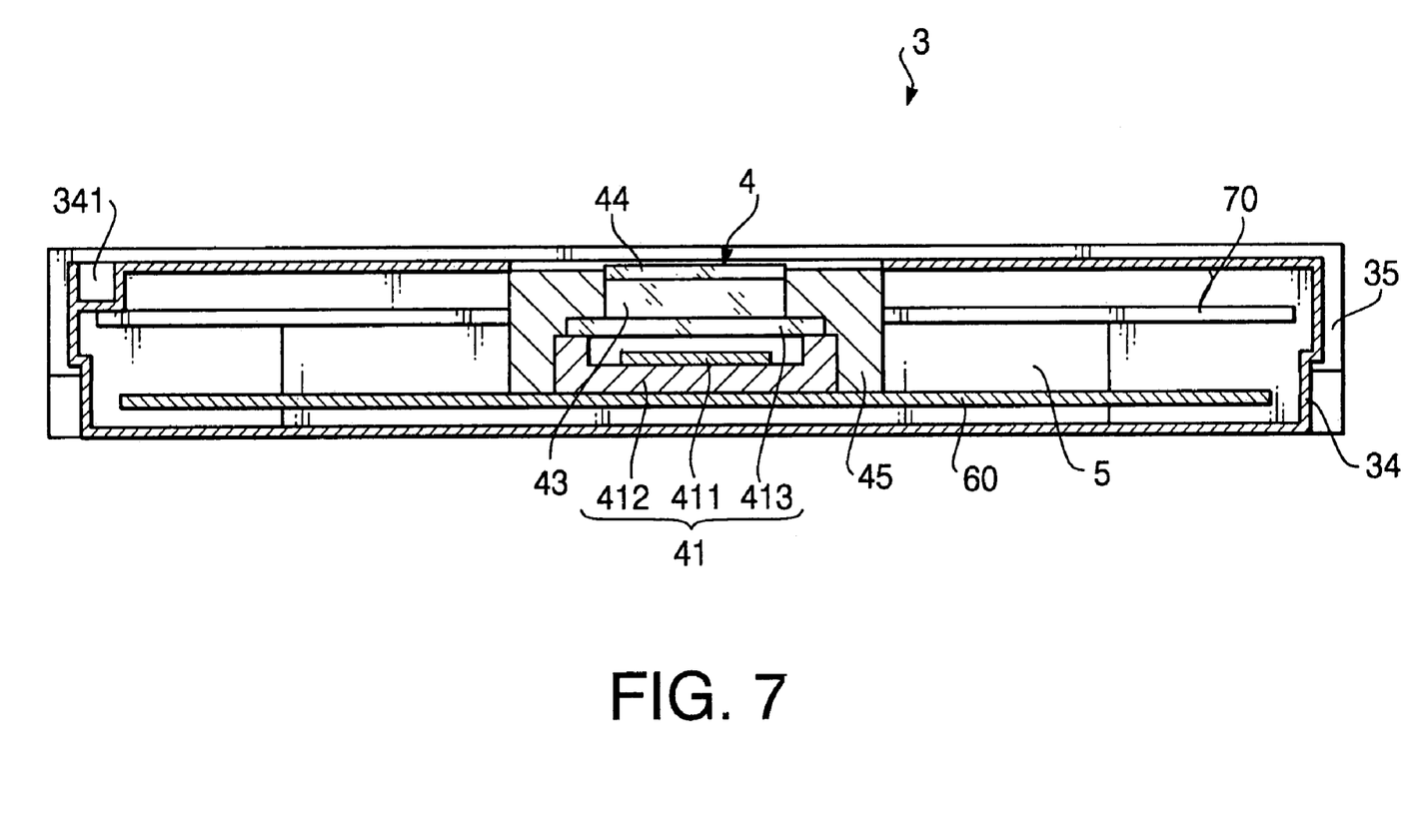
FIG. 7 is a cross-sectional view taken along the line VII-VII in FIG. 6.

FIG. 6 is a cross-sectional front view showing the imaging unit 3, and FIG. 7 is a cross-sectional view taken along the line VII-VII in FIG. 6. Referring to FIG. 6, in the casing 34 of the imaging unit 3, the imaging device board 60 is located close to a front end portion, and the main board 70 is located close to a rear end portion along the insertion direction. The imaging device board 60 includes the image pickup unit 4 fixed to a generally central portion thereof. The main board 70 includes the LCD monitor 5 fixed to a generally central portion thereof.

Referring to FIG. 7, the image pickup unit 4 includes the CCD imaging device 41, an optical low-pass filter 43 and an infrared cut filter 44 stacked on the receiving surface side of the CCD imaging device 41, and a housing 45 supporting the outer periphery of these components.

The optical low-pass filter 43 serves to reduce a spatial frequency component close to a sampling spatial frequency determined by a pixel spacing of the CCD imaging device 41, out of the spatial frequency of the object light. The optical low-pass filter 43 prevents appearance of a false color (moire).

The infrared cut filter 44 serves to exclude an infrared wavelength component. The infrared cut filter 44 prevents the CCD imaging device 41 from receiving an infrared light, which is invisible to a human eye.

The housing 45 is fixed to the casing 34, and the imaging device board 60 is fixed to the housing 45.

The image pickup unit 4 and the LCD monitor 5 are positioned so as not to appear overlapping when viewed from a direction perpendicular to the receiving surface of the image pickup unit 4 (Ref. FIG. 6), but to appear partially overlapping when viewed from the insertion direction (i.e. a direction parallel to the receiving surface of the image pickup unit 4) as shown in FIG. 7. In other words, the image pickup unit 4 and the LCD monitor 5, both of which are relatively thick, are located with a spacing in a direction parallel to the faces thereof, instead of being stacked in a thicknesswise direction. Such a configuration allows reducing the thickness of the casing 34, thereby enabling the inclusion of the LCD monitor 5 while reducing the thickness of the imaging unit 3.

Further as shown in FIG. 6, the image pickup unit 4 and the LCD monitor 5 are aligned in this order from a front end portion toward a rear portion along the insertion direction, i.e. from the right toward the left in FIG. 6. Accordingly, the lid 35 is located in a forward region along the insertion direction when set at the closed position. Such a structure allows the lid 35 to start moving toward the open position, at an initial stage of the insertion of the imaging unit 3 into the holding section 25. This ensures that a sufficiently large space is created when the lid is opened.

Further, the imaging device board 60 and the main board 70 are located with a spacing in a thicknesswise direction (Ref. FIG. 7), in other words positioned so as to appear partially overlapping when viewed from a direction perpendicular to the receiving surface of the image pickup unit 4 (Ref. FIG. 6). Such an arrangement reduces the size of the casing 34 by the same dimension as the overlapping portion of the imaging device board 60 and the main board 70, which leads to reduction in dimensions of the imaging unit 3.

A camera system 1 constituted of the foregoing camera body 2 and the imaging unit 3 allows a user to newly purchase only the imaging unit 3 for combination with the camera body 2 that the user currently owns, when the camera manufacturer releases a new imaging unit embodying a technical progress such as an improvement in image resolution or image processing technique, or reduction of power consumption, thus to enjoy the benefit of the innovation.

Likewise, when the camera manufacturer releases a new camera body embodying a technical progress such as a greater lens zoom magnification or a faster mechanical shutter speed, the user can repurchase only the camera body for combination with the currently owned imaging unit 3, thus to enjoy the benefit of the innovation.

When the user wishes to upgrade the performance of his/her camera system 1 (digital camera), the user has only to repurchase either the imaging unit 3 or the camera body 2, which significantly alleviates the economic burden. Especially in the case where the user owns a camera body provided with a high-quality lens unit such as a high-magnification zoom lens or a large-diameter lens, the user can enjoy a great advantage of continuing to use the camera body for a long period of time, incorporating a technical innovation in the imaging unit each time the innovation is made.

Figure 8:
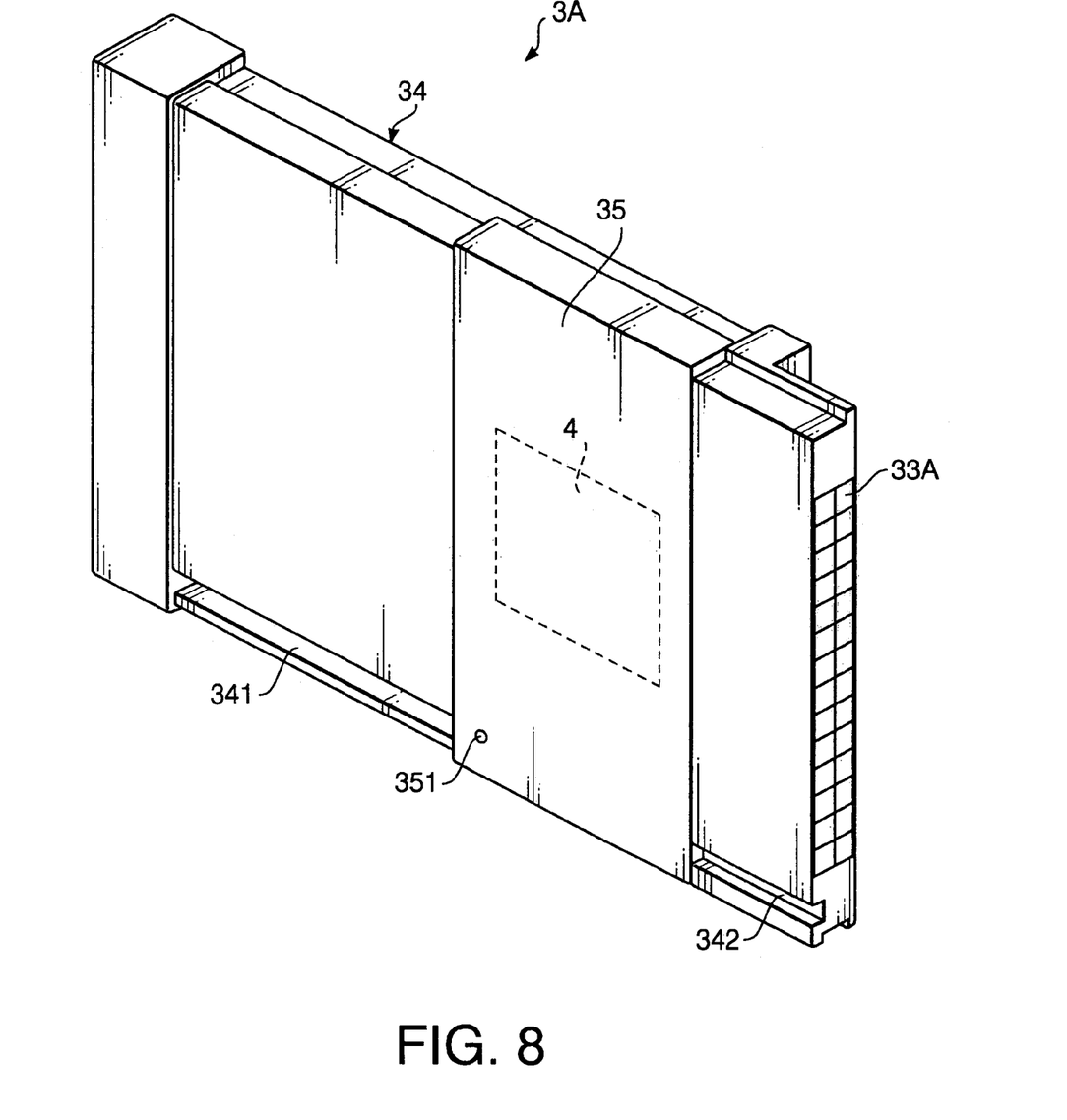
FIG. 8 is a perspective view showing a variation of the imaging unit according to the embodiment of the present invention.

FIG. 8 is a perspective view showing an imaging unit 3A which is a variation of the imaging unit 3. The following description on the variation of the imaging unit primarily refers to differences from the foregoing embodiment, omitting the description of similar features as the case may be. Since internal electrical components (e.g., the image pick-up unit 4) and the sliding mechanism of the lid 35 of the imaging unit 3A are the same as those of the above mentioned imaging unit 3, explanations thereof will not be repeated.

Referring to FIG. 8, the connector 33A of the imaging unit 3A complies with a standard of PC card connectors.

The outer profile of the imaging unit 3A is in conformity with a PC card standard established by PCMCIA (Personal Computer Memory Card International Association). More specifically, a thickness of the imaging unit 3A is one of the Type 1 (3.3 mm), Type 2 (5.0 mm), type 3 (10.5 mm) and Type 4 (16.0 mm) according to the PC card standard.

The imaging unit 3A thus constructed offers a great advantage when downloading the image data into a PC, since the imaging unit 3A can be inserted into a card slot of the PC.

Although the present invention has been described in details based on the embodiment shown in the accompanying drawings, it is to be understood that the present invention is not limited to the foregoing embodiment, and that any of the components of the imaging unit, the camera body and the camera system may be replaced with a different one that provides a similar effect. Also, an additional constituent may be optionally incorporated.

To cite a few examples, while a non-volatile memory is included in the imaging unit foe storing the data of a shot image according to the embodiment shown in the drawings, a recording medium such as a memory card including a non-volatile memory may be alternatively employed, to be loaded in a slot provided on the imaging unit or the camera body.

Also, while the camera body according to the embodiment shown in the drawings is provided with a zoom lens, the camera body may include a monofocal camera lens. Further, the camera body may be provided with a lens mount for replacement of the lens, instead of having an integral structure unified with the camera lens.

What is claimed is:

1. An imaging unit to be inserted into a camera body from a predetermined direction, thus to constitute a digital camera in combination with the camera body, comprising:
    an image pickup unit including an imaging device that obtains an object image;
    an imaging device driver that drives the imaging device;
    an image processor that processes an output signal of the imaging device;
    a casing for accommodating the image pickup unit, the imaging device driver and the image processor; and
    a lid attached to the casing so as to slide between a closed position where the lid covers a receiving surface of the image pickup unit, and an open position where the lid does not cover the receiving surface of the image pickup unit;
    wherein the lid is moved to the open position by a force exerted for inserting the imaging unit into the camera body.

2. The imaging unit according to claim 1, wherein the lid is attached to the casing so as to move parallel to an insertion direction of the imaging unit into the camera body.

3. The imaging unit according to claim 2, wherein the camera body includes an engaging portion to be engaged with the lid, so that an advance of the lid is blocked while the imaging unit is inserted into the camera body, and the lid relatively moves with respect to the casing in an opposite direction to the insertion direction, thus to reach the open position.

4. The imaging unit according to claim 2, wherein the lid is located in a forward region of the imaging unit along the insertion direction, when set at the closed position.

5. The imaging unit according to claim 1, further comprising an urging member that urges the lid toward the closed position.

6. The imaging unit according to claim 1, further comprising a connector for electrical connection with the camera body;
    wherein the connector is disposed at a front end portion of the imaging unit along an insertion direction of the imaging unit into the camera body.

7. The imaging unit according to claim 6, wherein the connected is configured as a standard interface connector.

8. The imaging unit according to claim 1, wherein an outside dimension of the imaging unit complies with a PC card standard.

9. The imaging unit according to claim 1, further comprising a display device that can display an image captured by the imaging device;
    wherein the display device has a display screen oriented opposite to the receiving surface of the image pickup unit.

10. The imaging unit according to claim 9, wherein the image pickup unit and the display device are positioned so as not to appear overlapping when viewed from a direction perpendicular to the receiving surface of the image pickup unit, but to appear at least partially overlapping when viewed from a direction parallel to the receiving surface.

11. The imaging unit according to claim 10, wherein the image pickup unit and the display device are aligned in this order from a front end portion toward a rear portion, along an insertion direction of the imaging unit into the camera body.

12. The imaging unit according to claim 11, further comprising:
   an imaging device board on which the imaging device driver and the imaging device are mounted; and
   a main board on which a display device driver, that drives the display device, and the image processor are mounted,
   wherein the imaging device board and the main board are positioned so as to appear partially overlapping when viewed from a direction perpendicular to the receiving surface of the image pickup unit.

13. The imaging unit according to claim 1, further comprising a non-volatile memory for storing image data of the object image obtained by the imaging device.

14. A camera body, comprising a holding member that holds the imaging unit according to claim 1.

15. A camera system, comprising:
   the imaging unit according to claim 1; and
   a camera body comprising a holding member that holds the imaging unit.

* * * * *